(12) United States Patent
Stephenson et al.

(10) Patent No.: US 12,059,667 B2
(45) Date of Patent: Aug. 13, 2024

(54) SUPERIOR CARBON ADSORBENTS (71) Applicant: PRAXAIR TECHNOLOGY, INC., Danbury, CT (US)

(72) Inventors: Neil A. Stephenson, E. Amherst, NY (US); Philip A. Barrett, Tonawanda, NY (US); Steven J. Pontonio, Eden, NY (US); Nicholas R. Stuckert, Grand Island, NY (US); Garrett R. Swindlehurst, Tonawanda, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 1046 days.

(21) Appl. No.: 16/966,292

(22) PCT Filed: Feb. 14, 2019

(86) PCT No.: PCT/US2019/018046
§ 371 (c)(1),
(2) Date: Jul. 30, 2020

(87) PCT Pub. No.: WO2019/161082
PCT Pub. Date: Aug. 22, 2019

(65) Prior Publication Data
US 2020/0368724 A1 Nov. 26, 2020

Related U.S. Application Data

(60) Provisional application No. 62/630,897, filed on Feb. 15, 2018.

(51) Int. Cl.
*B01J 20/28* (2006.01)
*B01D 53/047* (2006.01)
(Continued)

(52) U.S. Cl.
CPC ..... *B01J 20/28011* (2013.01); *B01D 53/0476* (2013.01); *B01J 20/18* (2013.01);
(Continued)

(58) Field of Classification Search
None
See application file for complete search history.

(56) References Cited

U.S. PATENT DOCUMENTS 4,921,831 A 5/1990 Nakai et al.
5,236,688 A 8/1993 Watanabe et al.
(Continued)

FOREIGN PATENT DOCUMENTS

DE 19826209 A1 12/1999
EP 0282053 A2 9/1988
(Continued)

*Primary Examiner* — Brit E. Anbacht
(74) *Attorney, Agent, or Firm* — Ralph J. Mancini (57) ABSTRACT

The present invention relates to a superior carbon adsorbent with or without a core. In one embodiment the carbon adsorbent of the present invention employs carbon adsorbent powder and an organic binding agent which are combined together with an appropriate solvent in an agglomeration step. In another embodiment the invention contemplates a core-in-shell adsorbent comprising an outer shell composed of a carbon and a non-adsorbing inert inner core. Low temperature processing of these agglomerates substantially preserves the binding agent within the final composition and allows one to prepare adsorbent products of high sphericity. The adsorbents of the invention possess superior characteristics such as higher mass transfer rate and $CO_2$ working capacity for use in a $H_2$PSA process.

18 Claims, 1 Drawing Sheet

(51) Int. Cl.
    *B01J 20/18*         (2006.01)
    *B01J 20/20*         (2006.01)
    *B01J 20/30*         (2006.01)
    *B01J 20/32*         (2006.01)

(52) U.S. Cl.
CPC ......... *B01J 20/20* (2013.01); *B01J 20/28004* (2013.01); *B01J 20/28016* (2013.01); *B01J 20/28019* (2013.01); *B01J 20/2803* (2013.01); *B01J 20/3028* (2013.01); *B01J 20/3204* (2013.01); *B01J 20/324* (2013.01); *B01J 20/3293* (2013.01); *B01D 2253/102* (2013.01); *B01D 2253/1085* (2013.01); *B01D 2253/116* (2013.01); *B01D 2253/25* (2013.01); *B01D 2253/304* (2013.01); *B01D 2253/311* (2013.01); *B01D 2256/10* (2013.01); *B01D 2256/16* (2013.01); *B01D 2257/104* (2013.01); *B01D 2257/404* (2013.01); *B01D 2257/504* (2013.01); *B01D 2257/702* (2013.01)

(56) References Cited

U.S. PATENT DOCUMENTS

| | | |
|---|---|---|
| 6,277,179 B1 | 8/2001 | Reymonet |
| 6,284,021 B1 * | 9/2001 | Lu .................. B01J 20/3433 95/114 |
| 6,500,234 B1 | 12/2002 | Ackley et al. |
| 6,503,299 B2 | 1/2003 | Baksh et al. |
| 8,814,985 B2 | 8/2014 | Gerds et al. |
| 2013/0196061 A1 | 8/2013 | Hull |
| 2017/0203346 A1 | 7/2017 | Hull |
| 2017/0247772 A1 | 8/2017 | Hull |

FOREIGN PATENT DOCUMENTS

| | | |
|---|---|---|
| EP | 1080771 A1 | 3/2001 |
| EP | 2198946 A1 | 6/2010 |
| GB | 1398466 A | 6/1975 |
| WO | 2008109882 A2 | 9/2008 |

\* cited by examiner

SUPERIOR CARBON ADSORBENTS

RELATED APPLICATIONS

This application claims the benefit of International Application No. PCT/US2019/018046, filed on Feb. 14, 2019 which claimed the benefit of U.S. Provisional Application Ser. No. 62/630,897, filed on Feb. 15, 2018, which are incorporated herein by reference.

FIELD OF THE INVENTION

The present invention relates to carbon adsorbents produced with or without a core and to a process for producing same. The adsorbents of the invention are characterized by utilizing an organic binder having a low activation temperature and a high sphericity greater than 0.8. The adsorbents of the invention are particularly suited for $H_2$ PSA processes among others.

BACKGROUND OF THE INVENTION

Activated carbons, which possess a wide range of pore structures and surface chemistry for adsorption of gases, can be utilized in pressure swing and thermal swing adsorption processes for separation and purification of gas mixtures. The activated carbons are often preferred over the zeolitic adsorbents in a gas separation process because of their relatively moderate strengths of adsorption for gases, which facilitate the desorption process. Activated carbons are highly effective in several commercial applications such as impurity removal from a contaminated gas, production of nitrogen from air, and production of hydrogen from a steam-methane reformer off gas. In one example, activated carbon is used as an adsorbent in an H2PSA process for the removal of $CO_2$ and/or hydrocarbons including $CH_4$ in a hydrogen stream. There are numerous prior art examples which describe this process in detail, including U.S. Pat. No. 6,503,299.

In another example, carbon molecular sieve is used as an adsorbent in an N2PSA process for the removal of oxygen from air. There are also many prior art examples which describe this process, including improvements in these processes that remain important goals, one principal means of which is the discovery and development of more effective adsorbents. Significant improvements have been achieved in not only adsorption selectivity and capacity, but also in unique ways to enhance the adsorption mass-transfer rate. With a fast mass transfer rate, one can often improve the recovery of PSA/VPSA systems and processes. This is discussed in U.S. Pat. No. 6,500,234.

One strategy to increase the mass transfer rate of an agglomerated adsorbent particle is to reduce the particle size of adsorbent aggregates. This increases the adsorption/desorption kinetics by reducing the path length needed for adsorbates to travel through the rate-limiting macropores of the agglomerated adsorbent. Reducing the particle size, however, has its limitations: higher pressure drop and increased risk of fluidization in unconstrained adsorption beds quickly become issues for adsorption process and system designs. Moreover, containment and manufacturing of small particle sized agglomerates represent other drawbacks that need to be resolved.

U.S. Pat. No. 4,921,831 describes a method for preparing an activated carbon. This includes pulverization of non-caking coal down to <10 microns, followed by granulation of the coal powder. Additives can be used to temporarily add strength during the process, which may include CMC, PVA, starches, hydrocarbon oils, etc. extrusion, compression, mixing, rolling techniques, etc. may be used for granulation. The resulting particles are dried and carbonized at 500-1000° C. under inert gas atmosphere to produce sufficiently strong activated carbon agglomerates. The present invention is distinct from the above since it involves utilizing a carbon powder, mixing with a sufficient quantity of organic binder, and activating at a low temperature sufficient for the purpose of removing components including pre-adsorbed water, but not sufficient to achieve complete carbonization of the binding agent, employed in these compositions. The resulting beads have high strength, high sphericity, and excellent adsorption properties. A decisive advantage over prior art is the avoidance of high temperature carbonization to achieve a high quality final product.

US2017/0247772 A1 describes a composite particle comprised of a core, which may be an aggregate of limestone, dolomite or another ore particle, surrounded by a coating layer of a metal dust and binder. One embodiment of this coating is iron oxide dust. The binder is generally a mineral clay such as bentonite, montmorillonite or kaolin, and comprises about 2-10% by weight of the particle. The particles are so formed to be used like any ordinary ore particle in an ore refining process. The size of the composite particles may range from a small pebble to a large size rock. The particles of this invention can be manufactured by a batch rolling process, using a roller such as a concrete mixer. This invention is used as a solution to finding ways to recycle and reuse metal oxide dust without having to dispose or initiate further process measures. This contrasts with our present invention, which utilizes activated carbon for PSA processes.

US2017/0203346 A1 describes a method of creating a chemical environmental barrier to isolate contaminated sediments from the environment. This is achieved by coating the contaminated layer with a mass of particles which can act as a sealant or which contain microbes which consume the contaminants. One embodiment of the invention utilizes the "AquaBlok" or "AquaGate" system. This comprises utilizing 5 to 10 mm core-shell particles having a rock, gravel, or sand type core and an outer sealant layer having at least one reactive material including clay or activated carbon. The AquaGate system comprises of a core which is at least partially encapsulated within a non-swelling reactive material to produce a porous treatment layer. This is used as a means to remove contamination from pore water and/or reduce the potential for contaminant breakthrough. The AquaBlok system provides an impermeable capping layer to provide isolation of contamination from surface water. This differs from the present invention which involves coating individual particles with an outer layer of activated carbon on a dense core to be used not as a sealant but as a gas adsorbent in a PSA process. The type of binder and/or additive used in the activated carbon layer is taught herein to have a significant effect on the gas adsorption rate. Certain additives can partially block adsorption pores and slow the adsorption rate. Because the Aquablok is used as a sealant, there is no consideration for additives which affect adsorption rate. Also, the material used in the "AquaBlok" or "AquaGate" system have no constraints on particle shape. This invention uses a forming method which results in a particle shape which is significantly more spherical for creation of an adsorption bed having low pressure drop and excellent gas flow distribution properties.

US2013/0196061 A1 describes a method of coating individual particles with a hydratable material layer at least partially encapsulating the core. The embodiment utilizes the "AquaBlok" particle system as referenced in the previous prior art. In addition, fibrous reinforcing material is used to at least partially encapsulate the core. The fibrous material can be either layered separately or premixed with the hydratable material. The fibers are added to act as reinforcing material to provide additional strength to the particles. The hydratable material generally consists of a clay which, when hydrated, expands and forms a barrier matrix. This composite particle differs from that of the present invention in that the composite of the invention does not contain any fibrous reinforcing material. The coating layer is composed of activated carbon and binder and is not prepared for use as a sealant but designed and conditioned for use as a gas adsorbent in a PSA process.

EP 1,080,771 describes a core-shell composite adsorbent with an inner core comprising a non-porous and non-adsorbent material and at least one outer layer comprising an adsorbent material. Such composite beads can be used to improve the mass transfer in adsorption processes without reducing the particle size of the beads. The disclosure in EP 1,080,771 teaches only the preferred core types and adsorbent shell types. There is no disclosure on other components, including a binding agent or agents which is a feature of the composite of the invention and also the critical low temperature processing to preserve or substantially preserve the binding agent or agents as part of the final composition.

U.S. Pat. No. 5,236,688 describes a method for calcining and activating spherical pitch beads in a fluidized bed. The beads are calcined at between 600-800° C. in an upper stage, then discharged to a lower stage, where they are activated at between 800-1200° C. This invention emphasizes the improvement of their calcination method so as to increase yield and reduce energy cost. A method of forming the pitch beads is explained, including melt molding the beads by first extruding the pitch, heating the broken extrudates to their softening point, then throwing them into water to form spheres. The composite adsorbents of the present invention differ for reasons stated earlier, in that the carbon-binder agglomerate is activated at a low temperature sufficient only for the purpose of removing components including pre-adsorbed water. A high strength, high sphericity carbon adsorbent with excellent adsorption properties can be produced without performing high temperature carbonization.

U.S. Pat. No. 8,814,985 to Gerds et al. discloses making of core-shell composite adsorbent beads having a porous and non-adsorbent core and a porous and adsorbent shell, claiming that the porous core enabled improved bead strength with even less inorganic binding agent, and therefore higher overall adsorption capacity. The beads preferably are manufactured by calcining together a non-sintered core and the adsorbent layer, with addition of inorganic binder (kaolin clay) as well as organic forming aids (e.g., polyvinyl alcohol, glycerin, and polysiloxane etc.). From the disclosure of Gerds et al a carbon adsorbent prepared with an organic binding agent and using low temperature thermal treatment to preserve or substantially preserve the binding agent as part of the product composition is not taught.

This present invention is directed to a unique carbon adsorbent with high sphericity that exhibits excellent adsorption properties and physical strength. The carbon adsorbents of the present invention comprise an adsorbent carbon and organic binding agent, wherein low temperature processing is employed to preserve or substantially preserve the binding agent within the final composition. In one embodiment, a non-porous core is added to the composition to form a core-in-shell carbon adsorbent. In the core-in-shell embodiment, non-porous cores having a high volumetric thermal capacity are employed to generate carbon adsorbent products with fast kinetics and heat management properties. Those skilled in the art will realize that fast adsorption kinetics enable process intensification. The thermal management aspect potentially enables suppression of adverse thermal gradients in the adsorption bed which in turn can lead to enhanced adsorbent working capacities in the PSA process.

SUMMARY OF THE INVENTION

The present invention provides superior agglomerated adsorbent compositions useful in adsorption and separation processes including cyclic gas separation processes such as $H_2$ PSA. The invention relates to a superior carbon adsorbent that can be made using commercial manufacturing processes known in the art, possessing good physical strength, and a higher mass transfer rate and heat capacity.

In another embodiment, the adsorbent is disposed in a core-in-shell arrangement, wherein an inert core is surrounded by a shell comprising carbon adsorbent. More specifically, the core-in-shell material is characterized by: 1) a non-adsorbing inert core material such as bauxite alumina, with a porosity of ≤10% and a volumetric heat capacity ≥1 J/cc-° K; 2) a total volume occupied by such core in the range of 10 to 90% and 3) wherein the adsorbent shell comprises an activated carbon with a binding agent and wherein the average product size ranges from 0.5 to 5 mm and the product sphericity is greater than 0.8.

The activated carbon can be derived from numerous sources. Any carbonaceous substance can be used as the raw material for activated carbon. The raw material used can depend on the difficulty in obtaining the material, amount required, price, reactivity with gas or chemicals, and appropriateness of quality for the products. Activation of the raw carbon material is achieved through heating above 700° C. in the presence of an activation gas to create a porous material. Most activated carbon sources, such as charcoal, coconut shell, and coal are activated in granular form and subsequently crushed to <0.1 mm to a powder form, which is ready for agglomeration with a binding agent or agents into the high sphericity carbon adsorbent particles of the present invention.

The binder is used to ensure adhesion of the activated carbon to itself and in cases where a core is used, adhesion to the core. The binding agent or agents can include any plasticizing organic binder materials. These can include binders such as any of the polysaccharides such as dextran, dextrin, corn starch, cellulose ethers etc. or any organic polymers. In one embodiment the adsorbent of the invention is a core-in-shell carbon adsorbent, where the core is chosen from materials possessing high density (low porosity) and preferably a high thermal capacity. Low porosity is considered important so as to minimize the non-selective gas adsorption in the core-shell particle. Ideally the porosity of the core, when measured by the Hg porosimetry technique (see Chapter 4 in "Analytical Methods in Fine Particle Technology" Paul A. Webb and Clyde Orr, ISBN 0-9656783-OX (1997)) is 10% or less. A core with high thermal capacity (e.g. at least 1 J/cc-K) is desired in order to manage the thermal gradients which are known to exist within an adsorbent bed during a process such as $H_2$ PSA.

DETAILED DESCRIPTION OF THE FIGURES

DETAILED DESCRIPTION OF THE INVENTION

The present invention relates to a superior carbon adsorbent with or without a core. In one embodiment the carbon adsorbent of the present invention employs carbon adsorbent powder and an organic binding agent which are combined together with an appropriate solvent in an agglomeration step. In another embodiment the invention contemplates a core-in-shell adsorbent comprising an outer shell composed of a carbon and a non-adsorbing inert inner core. The agglomerates are subjected to low temperature processing which substantially preserves the binding agent within the final composition and allows one to prepare adsorbent products of high sphericity. The adsorbents produced possess superior characteristics such as higher mass transfer rate and $CO_2$ working capacity for use in a $H_2$PSA process. The benefit of higher mass transfer rate has been well documented, while the benefit of higher heat capacity in VSA/VPSA/PSA systems was also demonstrated independently by incorporating solid cores. The present invention builds on these observations by identifying the preferred performance in a real environment.

With the core-in-shell adsorbent, the preferred range of core volume ratio is dependent on the specific application. When utilized in a bulk gas separation process, the preferred range of core volume ratio ranges from about 10-30%. Bulk gasses are generally defined as containing greater than about 1% by volume of the gas to be adsorbed. In this situation, a higher percentage of carbon shell is preferred to maximize the working gas capacity. In a purification process, the preferred range of core volume ratio ranges from about 60 to 90%. When removing only small amounts of gas from a stream, the adsorption rate becomes more important and a thinner shell will result in a higher adsorption rate. The inexpensive core-shell adsorbent significantly improves PSA performance while exhibiting good attrition resistance and low commercial cost of manufacturing.

Core volume ratio is measured by dividing the volume of the core by the volume of the final core-shell agglomerate. Both use the volume of sphere formula $(4/3)\pi r^3$. Radius was determined using average particle size as determined by sieve screens. A core volume ratio of from about 5-20% corresponds to a diameter ratio of from about 37-58%.

There are many adsorbent compositions and manufacturing processes known in the art for air separation processes and/or for hydrocarbon processing. There are numerous methods for adsorbent agglomeration. These methods include extrusion, compression, mixing, rolling, pan-pelletization, among others. The challenge in the development and commercialization of advanced adsorbents is balancing the physical and adsorption characteristics. Materials that have higher rates tend to have reduced physical strength as measured by crushing strength and attrition.

The carbon adsorbent of the present invention employs carbon adsorbent powder and an organic binding agent which when combined together with an appropriate solvent during an agglomeration step allows one to prepare adsorbent products of high sphericity. One method of agglomerating the particles, to achieve a final product having high crush strength and low attrition, is to use a layered approach wherein alternating layers of binding agent followed by carbon adsorbent are disposed in sequence. In one embodiment of a core-in-shell carbon adsorbent, the core can be coated with binding agent before a layer of carbon adsorbent is deposited and this process continued to achieve the desired core-shell ratio. The same general process is can be used to form carbon adsorbents without a core.

In one embodiment the carbon adsorbent of the invention comprises:
- 75-99 wt % of at least one carbon adsorbent.
- 1-25 wt %, in another embodiment 2-12 wt % and in another embodiment 3-7 wt % of at least one binder, wherein the adsorbent is characterized by a sphericity >0.8 and an LOI between 200 and 500° C. activation temperature of greater than or equal to 2% by weight up to about 15 wt %.

The adsorbents are also characterized by a product particle size of from about 0.5-5.0 mm, preferably the same as used for conventional VSA/VPSA/PSA process, and an attrition loss of less than or equal to about 5% of the product carbon adsorbent.

In another embodiment the carbon adsorbent of the invention is a core-in-shell material comprising:
- An adsorbent shell comprising 75-99 wt % of at least one carbon adsorbent and 1-25 wt %, in another embodiment 2-12 wt % and in another embodiment 3-7% of at least one binder.
- An inert core having extremely low porosity and a greater volumetric thermal capacity than alumina, in one embodiment the porosity being ≤10% in another embodiment ≤5%; and a volumetric thermal capacity ≥1 J/cc-K, in another embodiment ≥2.5 J/cc K)
- 10-90% volumetric ratio of core in bead, in another embodiment 10-30% volumetric ratio of core in the bead when used in a bulk separation, and 60-90% volumetric ratio of core in the bead when used in a purification separation for the critical balanced among performance, capacity and strength.
- 0.5-5.0 mm product particle size, preferably the same as used for conventional VSA/VPSA/PSA process.
- Less than or equal to 5 wt % attrition loss of the product core-in-shell carbon adsorbent.

Applicable carbon adsorbent compositions can be any carbon adsorbent materials in principle, including those termed activated carbon which comprise amongst others coconut shell, charcoal, coal, wood chip derived materials and their mixtures etc. Activated carbon has more than 2,500 commercial product applications, and is most commonly used to remove diverse, dissolved contaminants from water and process gas-phase streams. Generally, activated carbons are created from the carbonized raw materials (coconut shell, charcoal, coal, etc.) and gas (vapor, carbon dioxide, air, and combustion gas) which are reacted at elevated temperatures greater than 700° C. to produce materials having micropores with diameters of approximately 10 to 200 angstrom. Another attractive feature of activated carbons is their large surface area of about 500-2500 $m^2/g$ which enables various substrates to be adsorbed on the surface. In our examples, coconut shell activated carbon powder is used. The powdered activated carbon, such as that used in our examples, is often produced by milling larger particles of activated carbon down to micron sized powder. Other classes of carbon material, such as carbon molecular sieves (CMS), may be similarly pulverized and used together with the manufacturing method described herein to prepare carbon adsorbents from these other kinds of carbon starting materials. CMS products are often used to separate air to produce a nitrogen product. After preparing or obtaining the carbon starting material or materials in powdered form, where the powder particle size is advantageously ≤50 μm and preferably ≤25 μm and most preferably ≤10 μm, this is combined together with a binding agent or agents.

In terms of binder selection, it is important to use a binder system which effectively bond the activated carbons particles together yet does not deteriorate the adsorptive capacity or adsorption kinetics of the activated carbon by partially or completely occluding a portion of the adsorption sites. As such, the binder is preferably selected from the group that includes polysaccharides, (dextran, dextrin, corn starch, cellulose ethers etc.), organic polymers and mixtures thereof. The compositional range for the binder in the carbon adsorbents of the present invention has been determined based on that which provides the required crush strength and/or attrition resistance for use, while at the same time, still achieving a product with the required adsorption capacity and adsorption kinetics.

The amount of binder in the adsorbent of the invention is generally in the range of from about 1 to 25 wt % and in another embodiment from about 2 to 12 wt %; in another embodiment from about 3 to about 7 wt %. Of course, it is advantageous to use as little binder as is deemed necessary. As long as sufficient strength and attrition properties are achieved, using less binder will result in a higher adsorption capacity and potentially, higher adsorption kinetics. As can be seen in the examples, different binders will result in different adsorption and strength properties and amounts and types used must be adjusted according to the requirements of the application.

An agglomeration method for the carbon adsorbents of the present invention, which is particularly effective is to blend a fraction of the required binding agent together with the pulverized carbon prior to agglomeration and add the remainder of the binder to this mixture, during agglomeration. This stage of secondary binder addition can be affected by dissolving or dispersing the binding agent in a suitable solvent such as water. The particles of carbon adsorbent can be grown up to the target particle size in a layer-like fashion by adding a "layer" of premixed carbon adsorbent+binder and thereafter spraying this with a "layer" of binder-only dissolved and/or dispersed in a suitable solvent. This layer by layer growth is continued until the target particle size is reached. We have found this method to produce binder containing final products after drying, which meet both crush strength and/or attrition requirements and at the same time, lead to final product adsorbents with high capacity and fast adsorption kinetics. This method of agglomeration is suitable for the carbon adsorbents of the present invention, with and without a core. An example of a suitable binder for the secondary binder addition and layer by layer growth is a glucose polymer (e.g. dextran and cluster dextrin) dissolved in water which proved highly effective, due to its' "stickiness" since this helps the carbon adsorbent powder adhere to itself and/or the core which leads to controllable particle growth.

For the core-in-shell embodiment of the present invention, a substantially low porosity inert core is added to the composition, with the carbon and binding agent now forming the shell. The inert core, where the term inert implies the reactivity and adsorption properties of the core are negligible, of the present invention has overall porosity as measured by the Hg porosimetry method, less than or equal to about 10%, in another embodiment less than or equal to about 5%, in another embodiment less than or equal to about 2%. Porosity is defined as the non-solid or pore-volume fraction, i.e., pore volume/total volume. Since porosity is a volume ratio it is dimensionless and typically reported as a fraction or percent. Preferred low porosity core materials include, but are not limited to dense ceramics, sand, bauxite, cordierite, analcite, hematite, magnetite, granite, marble, dolomitic limestone, shale, etc. In one embodiment preferred cores are bauxite.

The inert core of the composite of the invention is also selected based on its volumetric thermal capacity, in order to manage the thermal gradients which can exist within an adsorbent bed. Without wishing to be bound by theory, it is believed that the performance improvements to the adsorption process, and more specifically to the VSA/VPSA/PSA performance, can be achieved by selection of such inert and non-porous cores with heat capacity values of $\geq 1$ J/cc-° K and preferably $\geq 2.5$ J/cc-° K. With higher heat capacity values than typical in homogeneous conventional adsorbent, the current new core-in-shell carbon adsorbents have the ability to manage the adverse temperature gradients that can be generated upon adsorption and desorption respectively. In contrast to prior art teachings, we recognize that the core-shell ratio must be adjusted differently if the application for the carbon core-in-shell adsorbent is a bulk separation or a purification. Bulk separation is defined herein as separations wherein the feed contains at least one impurity to be adsorbed which is present in the feed at a concentration of >1% by volume. A purification is defined herein as the case whereby the at least one impurity to be adsorbed is present in the feed at a concentration of $\leq 1\%$ by volume. If the intended separation is a bulk separation, the core-shell volumetric ratio is preferably in the range 10-30%. If the intended separation is a purification, the core-shell volumetric ratio is preferably in the range 60-90%. For applications where a thermal gradient is expected, it is desirable to use as high of a volumetric heat capacity material as possible, whilst adhering to the preferred core-shell volumetric ratio, described above depending on whether the separation is a bulk separation or a purification. The heat capacity of the material should be determined using standard references at conditions of operational use. The National Institute of Standards is an example of one such reference. If the core material is a composite, the heat capacity should be calculated according to generally accepted practice. The typical temperatures for operational use of interest are 200° K to 500° K.

Further, suitable cores should not have exceptional density. Density is defined as the mass per volume of a substance and is typically expressed as $g/cm^3$ or $kg/m^3$. As density increases, the cost to process during manufacture of the material, as well as the cost to ship the final product, the loading cost of the adsorbent in the vessels and the vessel structural cost increase. The preferred core will have a density of less than about 6 g/cc; in another embodiment less than about 5 g/cc.

TABLE 1

Materials Volumetric Heat Capacity (J/cc-° K)

| Material | Heat Capacity (J/g-° K) | Density (g/cc) | Volumetric Heat Capacity (J/cc-° K) |
| --- | --- | --- | --- |
| $Al_2O_3$ | 0.88 | 3.7 | 3.2 |
| Aluminum | 0.90 | 2.7 | 2.4 |
| Bismuth | 0.12 | 9.8 | 1.2 |
| Brass | 0.38 | 8.5 | 3.2 |
| Copper | 0.39 | 9.0 | 3.5 |
| Glass | 0.84 | 2.5 | 2.1 |
| Granite | 0.79 | 2.8 | 2.2 |
| Hematite ($Fe_2O_3$) | 0.65 | 5.7 | 3.7 |

TABLE 1-continued

Materials Volumetric Heat Capacity (J/cc-° K)

| Material | Heat Capacity (J/g-° K) | Density (g/cc) | Volumetric Heat Capacity (J/cc-° K) |
|---|---|---|---|
| Iron | 0.45 | 7.9 | 3.5 |
| Lead | 0.13 | 11.4 | 1.5 |
| SiO$_2$ | 0.75 | 2.3 | 1.7 |
| Steel | 0.50 | 8.05 | 4.0 |
| Tungsten | 0.13 | 19.3 | 2.6 |
| Zinc | 0.39 | 7.1 | 2.8 |

Table 1 is a sample of data obtained from the National Institute of Standards.

A key feature of the carbon adsorbents of the present invention, which applies to the carbon adsorbent with and without a core is the low temperature drying step that is performed to condition the material for use. Unlike prior art compositions and manufacturing processes, the drying step is carried out at a low temperature of ≤250° C. and preferably ≤200° C. At these low temperatures, the binding agent or agents are substantially preserved as part of the product composition and residual solvents, including any water are substantially removed. In the compositions of the prior art, high temperatures, usually >700° C. are used to breakdown the binding agents, if used, and convert them to new carbonaceous material. This low temperature drying step is best carried out under an inert purge gas (e.g. nitrogen or argon or mixtures thereof) or a vacuum. In principle, any purge gas or method that accomplishes the task of drying the material and substantially preserving the binding agent as part of the final product composition, may be used. The method for establishing the preservation of the binding agent is a Loss on Ignition test method (LOI). This method is described in detail in the examples section. Unlike the compositions of the prior art, the adsorbents of the present invention are characterized by a high LOI value, which is due to the preservation of the binding agent within the final composition. The LOI for the carbon adsorbents of the present invention is generally from about 1-15 wt %, in another embodiment from about 2-10 wt % and in yet another embodiment from about 2-5 wt %.

Preferred forms for the composite adsorbents are spherical particles with a sphericity of at least 0.8, as measured suitable means including particle image analysis methods. Typically, in particle image analysis methods, multiple particles per sample (e.g. >100 particles) are analyzed and the sphericity calculated as an average over all of the particles measured. Whilst particles with sphericity ≥0.8 are preferred which include beads, other forms such as pellets, extrudates and the like may be used. In terms of preferred particle sizes, those that give acceptable pressure drop in a VSA/VPSA/PSA system are acceptable, for example particles in the 4×30 US mesh size range are typical for many designs.

The specific examples provided herein disclose carbon adsorbents of the present invention with different binding agents and in core-in-shell compositions. These examples show that the products have excellent strength and adsorption properties.

Figure 1:
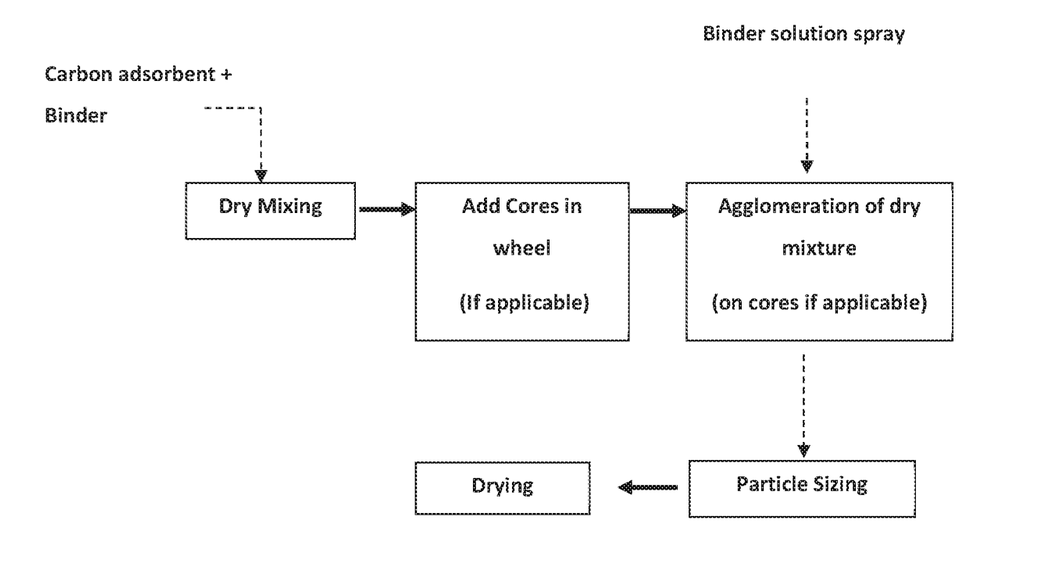
FIG. 1 show a schematic of the bead-making sequence of the invention.

For the examples and comparative examples described below wherein carbon adsorbent core-in-shell compositions are disclosed, the following generalized method of making was employed (see FIG. 1).

Step 1: Measure and mix carbon, binder, and water in an appropriate mixer. Generally, any mixer with sufficiently high shear such as a plow or Hobart would be sufficient. It is preferred to add the water to the activated carbon prior to the binder addition. Filling the activated carbon pores with water can possibly reduce pore access to the binder, thereby reducing the chance of partial pore blockage. The amount of water added during the mix should be enough to fully saturate the powder without forming chunks.

Step 2: Pre-screen the core particles to the desired particle size, load appropriate amount of such cores into revolving wheel as the bead forming machine. Spray cluster dextrin solution, or similar alternative, while alternatingly adding the above powder mixture, while the wheel rotates at steady speed. Grow the beads by continuing such until desired bead size is formed. In the examples, the bauxite core size was 1.0 mm and the final agglomerate size ranged from 1.4 to 2.36 mm. This results in a core/agglomerate volumetric ratio of from about 8 to 36%. Different volumetric ratios may be desired depending on the application. Applications needing a higher adsorption rate would require a higher ratio, resulting in a thinner shell. Applications requiring a higher working gas adsorption capacity would use a lower volumetric ratio. The core-shell examples as shown in this invention can produce any range of volumetric ratio for someone skilled in the art. The volume percentage of core in the bead can be calculated with the estimated average particle size of the core, vs. the final product.

Step 3: Dry the beads in nitrogen flow up to 200° C. for approximately 4 hours. For the carbon adsorbent compositions disclosed herein which are not of the core-in-shell type, the generalized manufacturing process illustrated in FIG. 1 can be used. The main changes for preparation of these non-core-in-shell adsorbents is in Step 2 above wherein the cores are not used and instead beads are grown to the target size using only the carbon, binder and water components instead.

Example 1—Activated Coconut Carbon with Dextran Binder 18030-01N (6% Binder, 1.0 mm Bauxite Core)

470 grams of activated coconut carbon powder (Calgon) was placed in a Hobart mixer. Thereafter with the mixer agitating, 120 grams water was pumped in at rate of 10 ml/min. At, the end of the addition, mixing was continued while 30.0 grams dextran M.W. 500,000 was gradually added over a 5 min. period. At the end of the addition, mixing was continued for 15 minutes. The mixed powder product labeled hereinafter "the formulation" was removed and temporarily placed in a container. 300 grams of 16×20 mesh Bauxite proppants Obtained from Agsco was placed in a 12" diameter rotating pan granulator and agitated therein at a speed of 30 rpm. 5% dextran solution was slowly sprayed in while gradually adding the formulation. Beads which entered the 8×14 mesh size were removed as product. In total, 312.0 grams coconut carbon powder, dextran, water powder mixture, and 124.0 grams 5% cluster dextran solution were added to the rotating pan. The 8×14 mesh product beads were air dried overnight prior to oven drying. The shallow tray drying method used a General Signal Company Blue M Electric oven equipped with a dry nitrogen purge. The adsorbents were spread out in stainless steel mesh trays to provide a thin layer. A purge of 200 SCFH of dry air was fed to the oven during drying. The temperature was set to 90° C. followed by a 360-minute dwell time. The temperature was then increased to 200° C. gradually over the course of a 360-minute period (approximate ramp rate=0.31° C./min) and held there for 4 hours before bottling hot.

Example 2—Activated Coconut Carbon with Microthene Binder 18030-02N (12% Binder, 1.0 mm Bauxite Core)

440 grams of activated coconut carbon powder (Calgon) was placed in a Hobart mixer. Thereafter with the mixer agitating, 120 grams water was pumped in at rate of 10 ml/min. At the end of the addition, mixing was continued while 60.0 grams Microthene FN51000 was gradually added over a 5 min. period. At the end of the addition, mixing was continued for 15 minutes. The mixed powder product labeled hereinafter "the formulation" was removed and temporarily placed in a container. 300 grams of 16×20 mesh Bauxite proppants Obtained from Agsco was placed in a 12" diameter rotating pan granulator and agitated therein at a speed of 30 rpm. 5% dextran solution was slowly sprayed in while gradually adding the formulation. Beads which entered the 8×14 mesh size were removed as product. In total, 258.0 grams coconut carbon, dextran, water powder mixture, and 99.0 grams 5% cluster dextran solution were added to the rotating pan. The 8×14 mesh product beads were air dried overnight prior to oven drying. The shallow tray drying method used a General Signal Company Blue M Electric oven equipped with a dry nitrogen purge. The adsorbents were spread out in stainless steel mesh trays to provide a thin layer. A purge of 200 SCFH of dry air was fed to the oven during drying. The temperature was set to 90° C. followed by a 360-minute dwell time The temperature was then increased to 200° C. gradually over the course of a 360-minute period (approximate ramp rate=0.31° C./min) and held there for 4 hours before bottling hot.

Example 3—Activated Coconut Carbon with Methyl Cellulose Binder SRS 2086.2 (7% Binder, 1.0 mm Bauxite Core)

20.0 lbs. of activated coconut carbon powder (Calgon) was placed in a MLH LS-50 plow mixer. Thereafter with the mixer agitating at 250 rpm, 5.6 lbs. water was pumped in at rate of 100 ml/min. At the end of the addition, mixing was continued while 683.4 grams methyl cellulose (8000 cps) was gradually added over a 15 min. period. At the end of the addition, plow mixing was continued for an additional 15 minutes. The plow mixed powder product labeled hereinafter "the formulation" was removed and temporarily placed in a drum. 20 lbs. of 16×20 mesh Bauxite proppants obtained from Agsco was placed in a tilted rotating drum mixer having internal working volume of ~75 L and agitated therein at a speed of 24 rpm. 7% Cluster dextrin solution was slowly sprayed in while gradually adding the formulation over an 8 hour period. Beads which entered the 8×14 mesh size were removed as product. For every 1000 g. of beads removed, 400 g. of (16×20) bauxite cores were added to the drum mixer. In total, 155.5 lbs. coconut carbon, methyl cellulose, and water powder mixture, and 57.5 lbs. 7% cluster dextrin solution were added to the rotating drum. The 8×14 mesh product beads were air dried overnight prior to oven drying. The shallow tray drying method used a General Signal Company Blue M Electric oven equipped with a dry nitrogen purge. The adsorbents were spread out in stainless steel mesh trays to provide a thin layer. A purge of 200 SCFH of dry nitrogen was fed to the oven during drying. The temperature was set to 90° C. followed by a 360-minute dwell time. The temperature was then increased to 200° C. gradually over the course of a 360-minute period (approximate ramp rate=0.31° C./min) and held there for 4 hours before bottling hot.

In the examples, 3 different binders were used in the shell of a core-shell adsorbent in which Bauxite constitutes the core. The same coconut shell activated carbon was used throughout and the bead forming was all completed using revolving wheels. The binders used were 6% dextran, 12% microthene, and 7% methyl cellulose in examples 1, 2, and 3 respectively. The final carbon adsorbent products from examples 1-3 were characterized by different techniques and the results are summarized in Table 2. As the data in Table 2 indicates, the use of different binders can lead to vastly different adsorption and physical properties. It is most preferred to use a binder which will maximize the physical properties without causing a decrease in the adsorption rate, which is most likely due to partial blocking of the carbon pores.

TABLE 2

Properties of Core-in-Shell Carbon Adsorbents Prepared Using Different Binders

| | Bead Size mm | Core Size mm | Core to Bead ratio by volume % | Core porosity % | Bead porosity % | $CO_2$ adsorption 10 Torr 1 minute weight gain % | $CO_2$ adsorption 10 Torr 1 hour weight gain % | $CO_2$ adsorption 10 Torr 1 min/ 1 hr ratio | LOI 200-500 C. % | Crush strength lbf | Attrition % |
|---|---|---|---|---|---|---|---|---|---|---|---|
| Example 1 | 1.85 | 1.0 | 15.7 | 1.5 | 40.1 | 0.22 | 0.22 | 1.00 | 4.8 | 1.8 | 0.58 |
| Example 2 | 1.85 | 1.0 | 15.7 | 1.5 | 39.3 | 0.06 | 0.25 | 0.24 | 5.4 | 0.5 | 5.74 |
| Example 3 | 1.85 | 1.0 | 15.7 | 1.5 | 33.3 | 0.27 | 0.27 | 1.00 | 5.8 | 3.3 | 0.18 |

The bead size represents the average particle size of the core-shell adsorbent product. Average particle size is determined using a standard screening analysis method using 100 g of calcined material in a Ro-tap® Sieve Shaker model RX-29 equipped with 8" diameter U.S. Standard mesh screens using 15 minutes of agitation. For these examples, the particles all fell between U.S. mesh sizes 10 and 12 (10×12 mesh). The bauxite core sizes were measured using the same method as the product beads.

Mercury (Hg) porosimetry measurements to determine the intra-particle void volume and adsorbent porosity were performed using a Micromeritics AutoPore IV instrument. Approximately, 1 g of sample was used for each measurement. The contact angle was fixed at 135° and intrusion and extrusion data were recorded over the pressure range from 0.5 psia to 61,000 psia. Contact angle for mercury as well as other relevant information regarding the porosimetry measurements can be found in Chapter 4 of "Analytical Methods in Fine Particle Technology" Paul A. Webb and Clyde Orr, ISBN 0-9656783-OX (1997).

Crush strength measurements were performed using a Dr. Schleuniger Pharmatron Tablet Tester 8M. The beads were activated before testing after which 40 beads were tested and averaged for minimum crush strength.

$CO_2$ adsorption rate was measured using a McBain balance. A McBain balance uses linear displacement of a sample pan or bucket attached to a quartz glass spring to measure the quantity of gas adsorbed by a particular sample. The quartz glass spring is contained within a vertical glass tube which provides a controlled atmospheric space into which the test gas can be introduced under controlled temperature and pressure conditions. In the experiments described herein ~1 gram of sample was used for each of the McBain measurements. The general procedure for a single sample measurement is as follows:

1. Bring the McBain apparatus to room pressure, take the "Empty Bucket Reading" (E) using a cathetometer or a similar suitable device.
2. Load ~1 gram of sample into the sample bucket, affix the glass tube surrounding the sample bucket and the quartz glass spring in place and take the "Before Activation Reading".
3. Evacuate the sample space within the glass tube surrounding the sample bucket and the quartz glass spring.
4. After the vacuum level has stabilized, heat each tube at a rate of 0.8° C. per minute to 200° C., and hold the sample at this temperature for at least 6 hours, while continuing to evacuate the sample space to thoroughly degas the sample.
5. Cool the sample tube to room temperature and take the "Activation Reading" (A) using the cathetometer.
6. For the carbon dioxide measurements, expose each tube to carbon dioxide at a pressure of 10 Torr and take the "Adsorption Reading" (F) using the cathetometer after 1 minute and 60 minutes exposure.

After the carbon dioxide measurements has been taken, the adsorption capacity can be calculated using Equation 1:

$$\text{Gas Adsorption Capacity, mass-\%} = 100(A-F)/(E-A) \quad (1)$$

where: A=Activation Reading, mm
E=Empty Bucket Reading, mm
F=Adsorption Reading, mm
100=conversion factor, mass/mass to mass-%

The adsorption rate data in Table 2 is expressed as a ratio of the % CO2 adsorbed after 1 minute of exposure to the % $CO_2$ adsorbed after 60 minutes exposure for the same sample. The ratio can vary between 0 and 1, with a ratio of 1 indicating that $CO_2$ adsorption equilibrium was reached before the 1 minute exposure time.

Sphericity is the measure of how closely the shape of an object approaches that of a mathematically perfect sphere. Sphericity is defined mathematically as Y=As/Ap, where Y is the sphericity, Ap is the surface area of a test particle P, and As is the surface area of a sphere S with the same volume as P. As an example, a sphericity test was performed on example 3 by Future Labs LLC, Madison, MS and was measured at 0.932.

Percent attrition is determined as the amount of product passing a U.S. Standard 25 mesh screen after 15 minutes of agitation using 100 g calcined material prescreened to greater than 25 mesh in a Ro-tap® Sieve Shaker model RX-29 equipped with 8" diameter screens.

The loss on ignition (LOI) values represent the weight loss on heating a sample of the carbon adsorbent product under nitrogen from 200 to 500° C. and maintaining the sample at 500° C. for an hour after an in-situ pretreatment step at 200° C. to remove water and other weakly held components. The LOI from 200 to 500° C. is expressed as a weight percent relative to the weight at 200° C. after an hour. A convenient method to record the LOI values uses thermogravimetric analysis which enables weight changes to be recorded at elevated temperatures. The method developed uses high purity nitrogen for the balance purge gas (commonly used) and the sample purge. The results presented herein were recorded on TGA55 thermogravimetric analysis systems from TA Instruments. For all experiments, a balance purge of 5 cc/minute was used and the gas directly over the sample was set to 95 cc/minute. Platinum pans were used for all studies and the sample size after 200° C. pretreatment was in the range 80 to 120 mg.

The TGA method involves both an in-situ pretreatment step followed by the LOI phase. The sample pretreatment was performed by heating the sample under nitrogen purge at 10° C. per minute to 200° C. and maintaining the sample isothermal at 200° C. for 60 minutes. The sample weight of the end of this pretreatment is defined as the Activated Sample Weight (ASW). For the LOI phase, the sample is heated at 10° C./minute to 500° C., then the temperature is held at 500° C. for 60 minutes, before cooling to ambient temperature. The weight after 60 minutes at 500° C. is referred to as the Weight at Higher Temperature (WHT). The LOI from 200 to 500° C. used herein corresponds to the weight difference between the Activated Sample Weight and the Weight at Higher Temperature divided by the Activated Sample Weight then the result is multiplied by 100 to convert the value to a percentage. Numerically, this corresponds to:

$$LOI = \{(WHT - ASW)/ASW\} \times 100$$

This temperature range was chosen so that only volatiles released from the binder were measured. A starting temperature of 200° C. is high enough to have removed any residual water but low enough that the binders suggested in this invention have not begun the decomposition process and by 500° C. decomposition should be complete. This method is applicable for carbon adsorbents with or without a core. However, for core-shell products for use in purification gas separation where the core volumetric ratio of the core-shell adsorbent ranges from about 60% to 90%, the shell must be separated from the core, and the LOI is measured for the shell portion only. This can be accomplished by applying gentle grinding techniques or similar such methods.

It is important to use similar sized core and final core-shell product sizes for each example when comparing the physical and adsorptive properties. Specifically, crush strength and adsorption rate can change significantly when comparing different sized particles, with crush strength increasing with size and adsorption rate possibly decreasing due to the increased diffusion path length. Significant differences in the porosity and particle density, which can vary depending on forming method, can also affect physical and adsorptive properties. Higher porosity materials tend to possess higher strength and lower rate. Examples 1 and 2 have similar sizes and porosities, and any differences in the properties can be attributed to the change in binder type.

We claim:
1. A core-shell carbon adsorbent for use in gas separation comprising an adsorbent shell and 10-90 vol % of inert core having a porosity less than 10%, wherein said adsorbent shell comprises from 75-99 wt % of at least one carbon adsorbent and from 1-25 wt % of at least one binder, wherein said adsorbent has a particle size of from 0.5 and 5 mm, a sphericity >0.8 and an LOI of from 1% to 15 wt %.

2. The core-shell adsorbent of claim 1 wherein said inert core is selected from ceramics, sand, bauxite, cordierite, analcite, hematite, magnetite, granite, marble, dolomitic limestone, shale, and combinations thereof.

3. The core-shell adsorbent of claim 1 wherein said inert core has a porosity of from 0 to 5%.

4. The core-shell adsorbent of claim 1 wherein said carbon is activated carbon derived from coal, charcoal, wood, coconut shell, polymer, pitch and mixtures thereof.

5. The core-shell adsorbent of claim 1 wherein said carbon is a carbon molecular sieve.

6. The core-shell adsorbent of claim 1 wherein adsorbent shell comprises from 2 to 12 wt % binder.

7. The core-shell adsorbent of claim 1 wherein adsorbent shell comprises from 3 to 7 wt % binder.

8. The core-shell adsorbent of claim 1 wherein the binder is selected from polysaccharides, organic polymers and mixtures thereof.

9. The core-shell adsorbent of claim 1 wherein the attrition loss of said adsorbent is less than or equal to 5 wt %.

10. The core-shell adsorbent of claim 1 wherein upon exposure to $CO_2$ at 10 Torr and near room temperature, the adsorption of $CO_2$ at 1 min. is at least 50% of the adsorption at 1 hour.

11. The core-shell adsorbent of claim 1 wherein the crush strength is >1 lb./force.

12. The core-shell adsorbent of claim 1 wherein for use in bulk gas separation the core volumetric ratio of the core-shell adsorbent ranges from 10% to 30%.

13. The core-shell adsorbent of claim 12 wherein an inert core has a volumetric thermal capacity higher than 1 J/cc-K.

14. The core-shell adsorbent of claim 12 wherein said adsorbent has an LOI from 200 and 500° C. activation temperature in the range of from 2 wt % to 15 wt %.

15. The core-shell adsorbent of claim 1 wherein the shell portion of said adsorbent has an LOI from 200 to 500° C. activation temperature in the range of from 2 wt % to 15 wt %.

16. A cyclic bulk gas separation process for separating at least two gaseous components having different adsorption characteristics from a gaseous mixture, said process comprising feeding a said gaseous mixture into an adsorption vessel containing the adsorbent of claim 1 wherein said composite adsorbent is capable of preferentially adsorbing one component of said gaseous mixture and separating same from the non-adsorbed component which passes through the adsorbent vessel as the recovered product.

17. The process of claim 16 wherein the separation is performed by vacuum swing adsorption, vacuum pressure swing adsorption, or pressure swing adsorption.

18. The process of claim 16 wherein the adsorbent also removes nitrogen oxides, hydrocarbons or both.

* * * * *